United States Patent [19]

Montross

[11] 3,755,681

[45] Aug. 28, 1973

[54] LIGHT OPERATED VARIABLE IMPEDANCE TRANSDUCER

[75] Inventor: Robert C. Montross, Mequon, Wis.

[73] Assignee: Square D Company, Park Ridge, Ill.

[22] Filed: Dec. 17, 1971

[21] Appl. No.: 209,331

[52] U.S. Cl. .................. 250/229, 250/237, 250/239
[51] Int. Cl. .......... G01d 5/34, H01j 3/14, H01j 5/02
[58] Field of Search ................ 250/239, 211 K, 229, 250/237, 217 SS

[56] References Cited

UNITED STATES PATENTS

| | | | |
|---|---|---|---|
| 3,171,034 | 2/1965 | Tomasulo et al. | 250/211 K |
| 3,662,373 | 5/1972 | Schumann | 250/229 X |
| 3,419,726 | 12/1968 | Olsen | 250/239 X |
| 3,293,513 | 12/1966 | Biard et al. | 250/217 SS |

*Primary Examiner*—James W. Lawrence
*Assistant Examiner*—T. N. Grigsby
*Attorney*—Harold J. Rathburn and William H. Schmeling

[57] ABSTRACT

A light operated transducer having a light emitting diode as a light source and a photosensitive transistor as a light responsive element. The light input to the transistor is varied by a member which is movable between the diode and transistor and formed of transparent material to have shaded areas formed according to a predetermined pattern so the intensity of light input to the transistor is varied in response to the movement of the member.

10 Claims, 7 Drawing Figures

LIGHT OPERATED VARIABLE IMPEDANCE TRANSDUCER

This invention relates to contactless transducers and particularly to a variable impedance device having a solid state light source and a solid state photosensitive device which is particularly useful for providing a potentiometer type function in solid state control circuits and the like.

Variable impedance devices, known as potentiometer resistors, commonly are used in solid state circuits to control the energization of electric motors. An example of a circuit having solid state components which control the energization of a traction motor in an industrial type electric truck in response to the operation of a potentiometer is disclosed in a U.S. Pat. No. 3,551,774, which was granted to Phillip H. Rusch on Dec. 29, 1970. While the circuitry disclosed in the Rusch patent has been used successfully in controlling the speed and direction of an electric truck, it has been found that the potentiometer controlling the speed of the traction motor is subject to bearing and contact wear.

One form of a contactless switching device which uses a light source, a solid state photosensitive element and a shutter which controls the transmission of light between the source and the photosensitive element is illustrated in a U.S. Pat. No. 3,336,482, which was granted to Robert C. Mierendorf, Erik J. Nielsen and Robert D. Boley on Aug. 15, 1967. The contactless switch, as disclosed in the Mierendorf et al. patent, basically is an ON-OFF type switch and includes a movable shutter which has an opening therein to either interrupt or permit light from an incandescent bulb to be received by a photosensitive diode. It is obvious that the shutter as used in the Mierendorf patent could be modified to include an opening having a shape which would cause the amount of light received by the diode to be varied so the switch will provide a potentiometer type output. However, it has been found that when light operated devices, which merely have shaped openings in shutters are used as potentiometers in environments subject to vibrations, the devices will have erratic outputs because of the undamped movement of the shutter in response to the vibrations.

Accordingly, it is an object of the present invention to provide an improved contactless variable impedance device of simple construction and small in size which is capable of providing a reliable potentiometer type output and which, when the device is subjected to vibration, is not susceptible to wear and contact problems present in resistive type potentiometers.

Another object is to provide a contactless solid state transducer having an actuator which is not subject to wear and is movable with little force.

A further object is to provide a compact, durable transducer wherein light from a light emitting diode impinging on a light sensitive transistor is varied by a member that is formed of transparent material to have shaded areas formed according to a pattern which will cause the impedance of the transistor to vary in a manner which will permit the transducer to replace a potentiometer in a solid state circuit.

An additional object is to provide a compact, durable transducer wherein light from a light emitting diode impinging on a light sensitive transistor is varied by a member that is formed of transparent material to have shaded areas formed according to a pattern which will cause the impedance of the transistor to vary in a manner which will permit the transducer to replace a potentiometer in a solid state circuit and to mount the member between two laminated parts with the member being positioned between the parts in an elongated window opening in the parts.

Further objects and features of the invention will be readily apparent to those skilled in the art from the following specification and from the appended drawings illustrating certain preferred embodiments, in which.

Figures 1, 2, 3, 4, 5, 6:
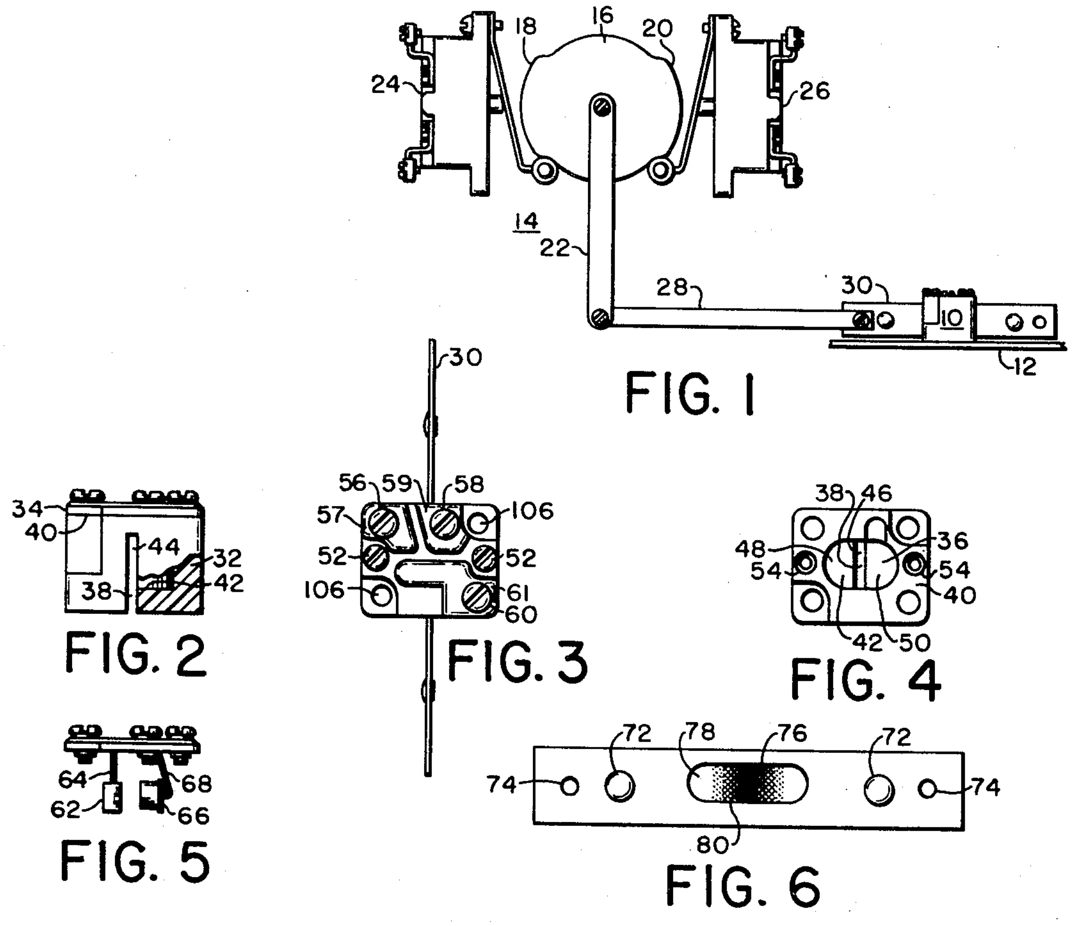
FIG. 1 is a view diagrammatically showing an operator which may be used to actuate a transducer according to the present invention.
FIG. 2 is an end plan view of the transducer shown in FIG. 1 with a portion thereof broken away to illustrate a rear wall of a cavity in the transducer.
FIG. 3 is a top plan view of the transducer in FIG. 1.
FIG. 4 is a top plan view of a base for the transducer in FIG. 1 with a cover and an actuator for the transducer removed.
FIG. 5 is a side plan view of the cover for the transducer in FIG. 1 with a light emitting diode and a light responsive transistor attached to the cover.
FIG. 6 is a side plan view of an actuator as used in the switch in FIG. 1.
Figure 7:
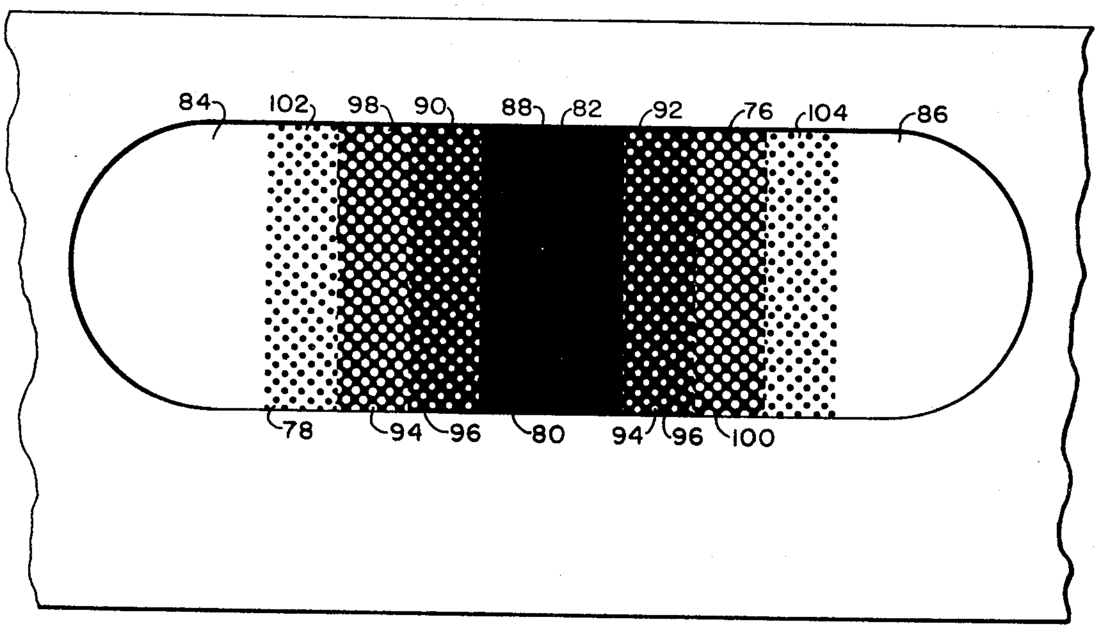
FIG. 7 is an enlarged view of a portion of the actuator in FIG. 6 showing a pattern on a transparent member which is positioned in an elongated opening in the actuator in FIG. 6.

Referring to the drawing, a transducer 10 in accordance with the present invention is shown as mounted on a portion of a support 12 and actuated by an operating mechanism 14. The operating mechanism 14 is shown diagrammatically to illustrate one form of a mechanism which may be used to operate the transducer 10 and includes a rotatable cam 16 having a pair of lobes 18 and 20 at its opposite sides and an operating lever 22. The operating mechanism 14 additionally includes additional switching means actuated by the cam lobes 18 and 20 and shown as snap switches 24 and 26. The lever 22 has an end connected through a link 28 to an actuator 30 for the transducer 10. The operating mechanism 14 may be part of a master and speed controlling switch for an industrial lift truck which controls the operation of the circuit as disclosed in the Rusch patent, supra. The cam 16 is rotatable from a neutral position, as shown, in a clockwise or counterclockwise direction. When the cam 16 is rotated in a counterclockwise direction, the lobe 18 will cause the switch 24 to be operated which will program the control circuit so the truck will move in a forward direction. The rotation of the cam 16 will also cause the lever 22 to rotate in a counterclockwise direction and the link 28 and the actuator 30 to move to the right in FIG. 1. When the cam 16 is rotated in a clockwise direction, the lobe 20 will cause the switch 26 to be operated which will program the control circuit so the truck will move in a reverse direction. The rotation of the cam 16 will also cause the lever 22 to rotate in a clockwise direction and the link 28 and the actuator 30 to move to the left in FIG. 1.

The transducer device 10 includes a molded base 32, a cover 34 for the base 32 and the actuator 30. The base 32 and cover 34 provide a housing that has an internal cavity 36 and a passageway 38 that extends along a plane which bisects the cavity 36. The base 32 is formed of a molded insulating material to have a block-like shape. The cavity 36 is oval shaped and extends inwardly into the base 32 from an open front end 40 to a rear wall 42 of the base. The passageway 38 is provided by aligned slots 44 in the side walls of the base 32 and a slot 46 in the rear wall 42. The slots 44 and 46 are arranged so that the passageway 38 extends completely through the base 32 and bisects the cavity 36 to provide a cavity portion 48 on the left side of the passageway 38 and a cavity portion 50 on the right side of the passageway as shown in FIG. 4.

The cover 34 is formed as a printed circuit board of a strip of relatively stiff insulating material and is secured to the top wall by a pair of self-tapping screws 52 which extend through openings in the cover 34 and are threaded into a pair of bores 54 in the base 32 to close the open front end of the cavity 36.

The cover 34 has three terminal screws 56, 58 and 60 located on its upper surface which are respectively connected to printed circuits 57, 59 and 61 on the front side of the cover. A light source is provided in the cavity 36 by a light emitting diode 66. The diode 66 has an infra-red output and in the embodiment shown is a Type IR-Lit 40, which is currently being sold by Litronix, Incorporated, Cupertino, Calif. The diode 66 has a pair of input leads 68 extending through the cover 34. The leads 68 are electrically connected to the printed circuits 61 and 59. The leads are arranged to position the diode in the cavity portion 50 so the light output of the diode 66 passes through a plane defined by the passageway 38 into the cavity portion 48.

A light receiving element is provided in the cavity 36 by a photosensitive transistor 62. The transistor 62 is of the Type 2N5780, currently sold by Motorola, Incorporated, Phoenix, Ariz. The transistor has a pair of terminal leads 64 extending through the cover 34. The leads 64 are electrically connected to the printed circuits 61 and 57. The leads 64 are arranged to position the transistor 62 in the cavity portion 48 to receive the light output from the diode 66.

The actuator 30 is positioned in the passageway 38 and includes a pair of laminated strip-like parts which are secured together by a pair of rivets 72. The laminated parts have a longitudinal length greater than the length of the passageway 38 and the rivets 72 are located to engage the external sides of the base 32 wherein slots 44 are located to limit the movement of the actuator 30 in the passageway 38. The laminated parts also are provided with openings 74 which will permit the actuator 30 to be connected to the link 28. A central portion of the laminated parts is provided with an oval-shaped elongated window opening 76. The opening 76 is located in the laminated parts to be in the light path between the diode 66 and the transistor 62. Laminated between the parts 70 in the opening 76 is a member 78. The member 78 is formed of a transparent material and has a pattern 80 thereon which causes the transparency of the member 78 to vary from a fully opaque portion 82 at the portion of the member located at the longitudinal center of the opening 76 to fully transparent portions 84 and 86 located at the left and right ends of the opening 76 respectively.

The pattern 80 is provided by a plurality of juxtaposed strip-like areas on the member 78 which extend along axes normal to the direction of movement of the actuator 30 across the entire width of the opening 76. The opaque portion 82 is formed by a strip 88 which is located at the longitudinal center of the opening 76. The strip 88 has a width equal to twice the width of the pattern of the light emitting from the diode 66 passing through the opening 76. Juxtaposed at opposite sides of the strip 88 are a pair of strips 90 and 92 each of which has transparent portions 94 and opaque portions 96 thereon arranged so that the strips 90 and 92 will permit 20 percent of the light output from the diode 66 to pass through the strips 90 or 92 when the strips 90 or 92 respectively are centered in the light output pattern of the diode 66. Juxtaposed at the left side of the strip 90 and the right side of the strip 92 are strips 98 and 100, respectively. The strips 98 and 100 have transparent portions 94 and opaque portions 96 thereon arranged so that the strips 98 and 100 will permit 40 percent of the light output from the diode 66 to pass through the strips 98 or 100 when the strips 98 or 100 are centered in the light output pattern of the diode 66. Juxtaposed at the left side of the strip 98 and the right side of the strip 100 are strips 102 and 104, respectively. The strips 102 and 104 have transparent portions 94 and opaque portions 96 thereon arranged so that the strips 102 and 104 will permit 60 percent of the light output from the diode 66 to pass through the strips 102 or 104 when the strips 102 or 104 are centered in the light output pattern of the diode 66.

And finally located at the left side of the strip 102 and the right side of the strip 104, respectively, are the transparent areas 84 and 86 of the member 78. As shown, the degree of transparency of the strips described is provided by opaque or transparent spaced dots which are arranged in patterns on the strips to vary the light transmitting capability of the strips.

In the embodiment shown, the member 78 resembles a black and white type photographic negative and may be reproduced from a master copy of the member 78 by a process called a positive contact process in the half-tone printing art on ortho-type film, as known in the photographic arts. Ortho film is preferred because it will reproduce a pattern in either fully transparent or fully opaque areas without any gray areas when it is exposed to a pattern. When the film is developed, the opaque areas on the film will have the capability of blocking the transmission of the infra-red light output of the diode 66.

It is well known that many materials which are capable of blocking light in the visible spectrum are incapable of blocking the transmission of infra-red light. Thus the operation of the transducer 10 will not be impaired by contaminants which are incapable of blocking infrared light.

The transistor 62 is characterized by its ability to provide a high resistive impedance between the pair of leads 64 when it is not exposed to a light input and a progressive decrease in the impedance between the leads 64 in response to a progressively increasing change in a light input which it receives. When the actuator 30 is positioned at its neutral position with the strip 88 centered in the light output pattern of the diode 66, the transistor 62 will cause the impedance between the lead 64 to be at a maximum value. The strip 88 has a width equal to twice the width of the light output pattern of the diode 66 to provide a dead zone which requires the actuator to be moved a slight distance in either direction from its neutral position before the transistor 62 will exhibit a change in impedance. The strips 90, 92, 98, 100, 102 and 104 each has a width equal to the width of the light output pattern of the diode 66.

A progressive displacement of the actuator 30 to the left from the neutral position will sequentially cause certain areas of the strips 90, 98 and 102 to be interposed progressively in the light output pattern of the diode 66 and thereby gradually increase the intensity of the light input to the transistor 62 in stepless degrees. The transistor 62 in response to the increased intensity of the light input decreases the impedance between the leads 64 from a maximum value in stepless increments to a minimum value which occurs when the transparent portion 84 is interposed in the light output pattern from the diode 66.

When the actuator 30 is progressively moved to the right from its neutral position, strips 92, 100 and 104 will be sequentially interposed between the diode 66 and the transistor 62 and cause the light input to the transistor 62 to progressively increase. The impedance of transistor 62 in response to the increased intensity of the light input, progressively decreases to a minimum value which occurs when the transparent portion 86 is interposed in the light output pattern from the diode. Similarly, when the actuator 30 is moved to position the strip 88 from a location either to the left or the right of the neutral position towards the neutral position, the impedance of the transistor will progressively increase to a maximum value which occurs when the strip 88 is centered between the diode 66 and the transistor 62.

The transducer 10 is mounted on the panel 12 by a pair of screws which are received in openings 106 in the base 32. When the transducer 10 is mounted on the panel 12, the actuator 30 will be maintained in the passageway 38 by a portion of the panel 12. If it is required to maintain the actuator 30 in the passageway 38 independently of the panel 12, a suitable member, not shown, may be attached externally to the rear wall 42.

While certain preferred embodiments of the invention have been specifically discloseed, it is understood that the invention is not limited thereto, as many variations will be readily apparent to those skilled in the art and the invention is to be given its broadest possible interpretation within the terms of the following claims.

What I claim is:

1. A contactless variable impedance device comprising: a housing having an internal cavity and a passageway extending along a plane passing through the cavity and walls of the housing, a light source, a light responsive element having a pair of terminals and providing a change in resistive impedance between the terminals in response to a change in the intensity of a light input to the element, means mounting the light source and the light responsive element in the cavity at opposite sides of the plane so the light output from the light source passes through the plane and is transmitted as a light input to the light responsive element, a pair of laminated strip-like parts movable in the passage-way and having an elongated window movable in the passage-way between the light source and the light responsive element, a member positioned between the laminated parts and having a portion extending in the elongated window, said member being formed of a transparent material and said portion having a pattern thereon, said pattern varying from transparent to opaque for gradually the intensity of the light input to the light responsive element in stepless degrees in response to the movement of the member in the plane.

2. The variable impedance device as recited in claim 1 wherein the member is a thin sheet of orthofilm.

3. The variable impedance device as recited in claim 1 wherein the pattern variation is provided by juxtaposed strip-like areas on the member which progressively vary step-by-step in transparency.

4. The variable impedance device as recited in claim 3 wherein the strip-like areas on the member are formed by opaque and transparent areas on the member.

5. The variable impedance device as recited in claim 4 wherein one of the strip-like areas is opaque and centrally located on the member between strip-like areas having transparent areas which are provided by spaced transparent dots.

6. The variable impedance device as recited in claim 4 wherein the strip-like areas having transparent dots are located between the opaque strip-like area and a transparent area of the member.

7. The variable impedance device as recited in claim 1 wherein the light source is provided by a light emitting diode and the light responsive element is a photosensitive transistor.

8. The variable impedance device as recited in claim 7 wherein the housing includes a molded block-like base and a cover and wherein the cavity and passageway are included in the base and the cover provides a mounting for the diode and the transistor.

9. The variable impedance device as recited in claim 8 wherein the pattern variation is provided by juxtaposed strip-like areas on the member which progressively vary step-by-step in transparency.

10. The variable impedance device as recited in claim 9 wherein the strip-like areas on the member are formed by opaque and transparent areas on the member.

* * * * *

PO-1050
(5/69)

UNITED STATES PATENT OFFICE
CERTIFICATE OF CORRECTION

Patent No. 3,755,681 Dated August 28, 1973

Inventor(s) Robert C. Montross

It is certified that error appears in the above-identified patent and that said Letters Patent are hereby corrected as shown below:

Col. 5, line 39, "discloseed" should read --disclosed--.

Col. 6, line 13, insert "varying" after --gradually--.

Signed and sealed this 16th day of April 1974.

(SEAL)
Attest:

EDWARD M.FLETCHER,JR.
Attesting Officer

C. MARSHALL DANN
Commissioner of Patents